(12) United States Patent
Saito

(10) Patent No.: US 8,638,930 B2
(45) Date of Patent: Jan. 28, 2014

(54) RANDOM NUMBER VERIFICATION METHOD AND RANDOM NUMBER VERIFICATION APPARATUS

(75) Inventor: Takeshi Saito, Iruma (JP)

(73) Assignees: Leisure Electronics Technology Co., Ltd., Tokyo (JP); Takeshi Saito, Saitama (JP)

( * ) Notice: Subject to any disclaimer, the term of this patent is extended or adjusted under 35 U.S.C. 154(b) by 1541 days.

(21) Appl. No.: 11/226,515

(22) Filed: Sep. 13, 2005

(65) Prior Publication Data

US 2006/0008083 A1    Jan. 12, 2006

Related U.S. Application Data

(63) Continuation of application No. PCT/JP03/02992, filed on Mar. 13, 2003.

(51) Int. Cl.
*H04L 9/00*    (2006.01)

(52) U.S. Cl.
USPC ............................... 380/46; 463/22; 708/250

(58) Field of Classification Search
None
See application file for complete search history.

(56) References Cited

U.S. PATENT DOCUMENTS

| | | | |
|---|---|---|---|
| 3,309,509 A | | 3/1967 | Vasseur |
| 4,527,798 A | * | 7/1985 | Siekierski et al. .............. 463/17 |
| 6,401,045 B1 | * | 6/2002 | Rogers et al. ................... 702/51 |
| 6,542,014 B1 | * | 4/2003 | Saito .............................. 327/164 |
| 6,675,113 B2 | * | 1/2004 | Hars ................................ 702/75 |
| 6,732,127 B2 | * | 5/2004 | Karp .............................. 708/250 |
| 7,080,106 B2 | * | 7/2006 | Ikeda et al. .................... 708/250 |
| 7,508,945 B1 | * | 3/2009 | Ferre Herrero ............... 380/268 |

FOREIGN PATENT DOCUMENTS

| | | |
|---|---|---|
| JP | 08-227682 | 9/1996 |
| JP | 2000-042234 | 2/2000 |
| JP | 2000-237437 | 9/2000 |
| JP | 2000-276330 | 10/2000 |
| JP | 2003-029963 | 1/2003 |
| JP | 2003-029964 | 1/2003 |

OTHER PUBLICATIONS

Knuth, D. E., "Random Numbers", Art of Computer Programming, Aug. 2000, pp. 42-47 and 61-75.
PCT International Search Report for PCT/JP03/02992, mailed Jul. 8, 2003, 6 pages.

(Continued)

*Primary Examiner* — Kaveh Abrishamkar
(74) *Attorney, Agent, or Firm* — Blakely, Sokoloff, Taylor & Zafman LLP

(57) ABSTRACT

Disclosed is a random number verification method and apparatus capable of quickly detecting the fact that a random number generation device designed to generate substantially authentic random numbers has become unable to generate authentic random numbers due to a malfunction, wrongful manipulation or the like. When random numbers randomly generated as n kinds of values are verified, a random number verification method according to one aspect of the present invention comprises a random number acquisition step of selecting a number m of the values, a counting step of counting the number of ones occurring p times ($0 \leq p < m$) in the n kinds of values, a comparison step of comparing the number obtained in the counting step with a predetermined first threshold, and a determination step of, when it is found the number is greater than the first threshold as the result of the comparison step, determining that the random numbers have a problem.

2 Claims, 10 Drawing Sheets

(56) References Cited

OTHER PUBLICATIONS

PCT Notification of Transmittal of the International Preliminary Examination Report for PCT/JP03/02992, mailed Jun. 14, 2005, 11 pages.

PCT Written Opinion of the International Preliminary Examining Authority for PCT/JP03/02992, mailed Dec. 21, 2004, 4 pages.
Official Action for Japanese application No. 2004-569350, dated Jun. 23, 2008, 2 pages.
Supplementary European Search Report for EP03708591, dated Dec. 17, 2007, 4 pages.

* cited by examiner

RANDOM NUMBER VERIFICATION METHOD AND RANDOM NUMBER VERIFICATION APPARATUS

CROSS-REFERENCE TO OTHER APPLICATIONS

This is a continuation of PCT Patent Application No. PCT/JP2003/002992, filed on Mar. 13, 2003.

TECHNICAL FIELD

The present invention relates to a random number verification method and apparatus for detecting a malfunction of a random number generation device or a possibility of malicious or wrongful manipulations of the random number generation device, on the basis of values generated from the random number generation device.

BACKGROUND ART

Heretofore, there have been known various methods for generating random numbers, such as a method using a computer to generate random numbers on a software basis, and a method using a counter or the like to generate pseudo random numbers. These random numbers generated by the conventional methods cannot be regarded as authentic random numbers, and it can only be evaluated how close the random numbers are to authentic random numbers. For example, a conventional method for such an evaluation comprises acquiring a large number of values which are generated as random numbers through a large-scale computer, and checking respective occurrence distributions of the acquired values to evaluate how evenly each of the values occurs, on the basis of the occurrence distributions. This evaluation method premised on acquiring a large number of values and checking respective occurrence distributions of the values essentially requires a long time to obtain an evaluation result.

Under the circumstance where random numbers are increasingly being used for various simulations—for example, in the fields of financial derivatives, strength simulations for buildings, weather forecasts and simulation-based advanced game machines—a random number generation device to be used in these fields is required to generate extremely authentic random numbers at a high speed. For a random number generation device meeting such requirements, a random number generation method utilizing a random natural phenomenon has been proposed.

In recent years, a random number generation device has become known which is designed to generate random numbers using thermal noise occurring inside a resistor, a conductor or a semiconductor, as means for realizing the above natural phenomenon-based random number generation method. In view of its advantage of being able to have a relatively simple circuit configuration, this random number generation device is expected to allow substantially authentic random numbers to be conveniently used in various fields.

In a process of producing and shipping the random number generation device in/from a production plant, it is necessary to inspect whether the apparatus normally operates, before the shipment. Further, when the random number generation device is installed in various commercial products or incorporated in an IC card or the like in the form of an IC chip, the apparatus after shipment is likely to have a malfunction, or to undergo a malicious or wrongful manipulation intended, for example, to intentionally increase or reduce an occurrence frequency of a specific value. Thus, it is necessary to develop a method or means for quickly detecting such abnormalities. However, as to a random number generation device designed to generate substantially authentic random numbers, no method capable of readily/reliably detecting the occurrence of abnormalities, such as malfunctions and wrongful manipulations, has been established so far.

In view of the above technical background, it is therefore an object of the present invention to provide a random number verification method and apparatus capable of quickly/reliably detect that a random number generation device designed to generate substantially authentic random numbers has become unable to generate authentic random numbers due to a malfunction, wrongful manipulation or the like.

DISCLOSURE OF THE INVENTION

In a random number verification according to a first aspect of the present invention (Random Number Verification I), when random numbers to be randomly generated as n kinds of values are verified, a number m of the values are firstly selected, for example, from a random number generation device. Then, the number of ones occurring p times ($0 \leq p < m$) in the n kinds of values is counted, and the obtained number is compared with a predetermined first or second threshold. As the result of the comparison, when the number is greater than the first threshold or less than the second threshold, it is determined that the random numbers have a problem.

In a random number verification according to a second aspect of the present invention (Random Number Verification II), when random numbers to be randomly generated as n kinds of values are verified, a period of selecting a given number of the values is defined as one round. Then, with respect to each occurrence frequency equivalent to how many times a specific one of the n kinds of values occur per round, a probable distribution of the number of values to be generated within one round is prepared. When a deviation from the distribution occurs in the given number of values actually sampled, it is determined that the random numbers have a problem.

In a random number verification according to a third aspect of the present invention (Random Number Verification III), when a random number generation device is designed to generate a known number of random numbers within a given time, two appropriate numbers greater and less than the known number are defined, respectively, as an upper limit and a lower limit, and the number of the random numbers generated from the random number generation device within the given time is monitored. When the monitored number deviates beyond either one of the upper and lower limits, it is determined that a problem has occurred in the random number generation device.

BEST MODE FOR CARRYING OUT THE INVENTION

Figure 1:
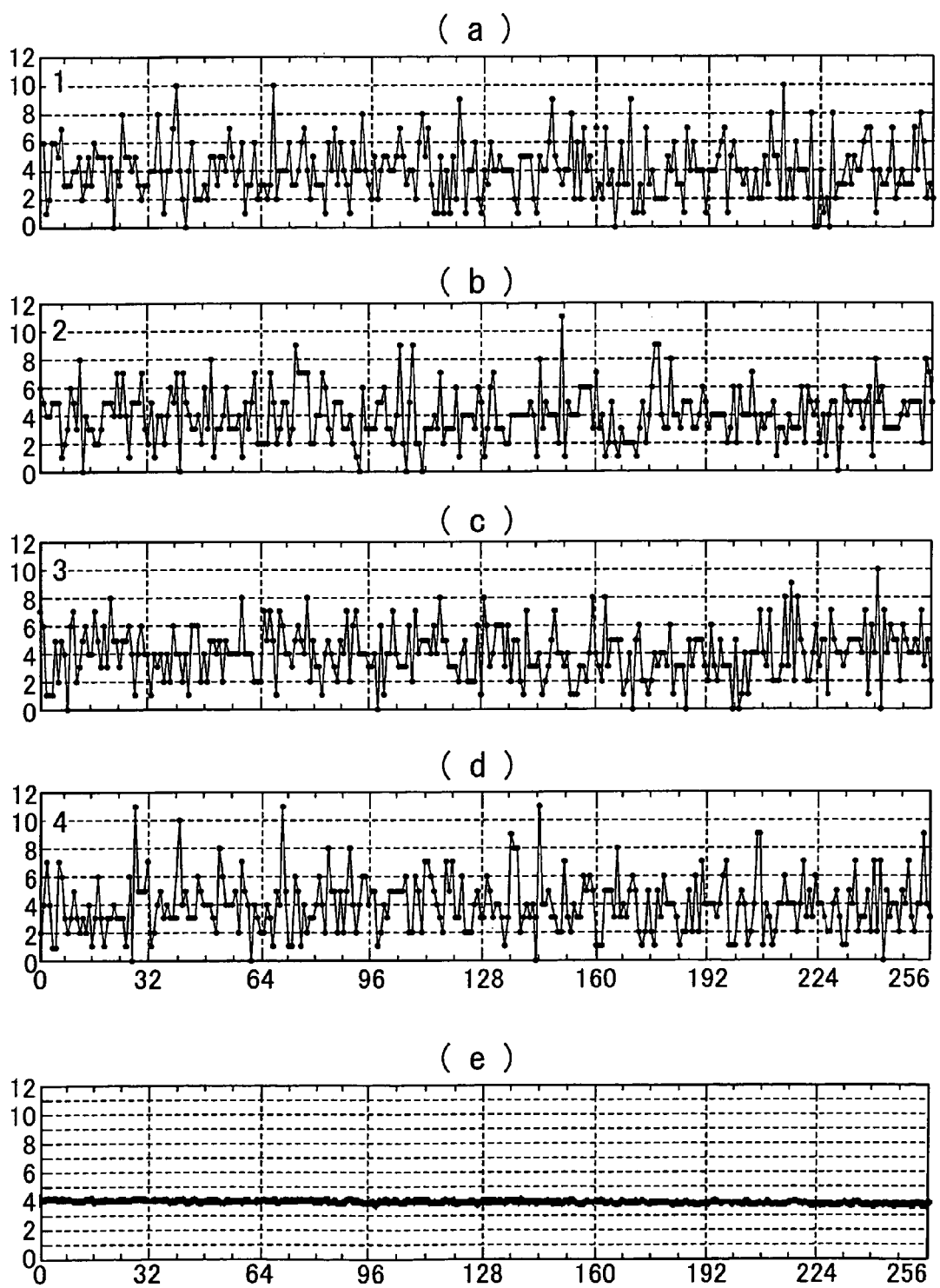
FIGS. 1(a) to 1(d) are graphs showing a test result obtained by continuously sampling 1024 of 8-bit values [256 kinds of values (hereinafter referred to as "basic-values") ranging from 0 to 255 in decimal] actually generated from a random number generation device, and counting an occurrence number (or frequency) of each of the basic-values, wherein the horizontal axis represents the basic-values, and the vertical axis represents the counting result (occurrence frequency).
FIG. 1(e) is a graph showing an average occurrence frequency per round of each of the basic-values, which was prepared by performing 1000 rounds of samplings from the random number generation device to accumulate an occurrence frequency of each of the basic-values, and dividing the accumulated occurrence frequency by 1000.

A random number verification method and apparatus according to an embodiment of the present invention will now be described. The applicant proposed a random number generation device capable of generating substantially authentic random numbers in a simplified structure, in International Application PCT/JP03/01100 filed on Feb. 4, 2003 at the Japan Patent Office. Such a random number generation device adapted to generate substantially authentic random numbers is suitable for a random number verification according to the random number verification method and apparatus of the present invention. However, a random number generation device suitable for the verification according to the method and apparatus of the present invention is not limited to that disclosed in the above application.

Firstly, a random number verification method according to one embodiment of the present invention will be described below. While the following description will be made on the assumption that the random number verification method is applied to a random number generation device adapted to randomly generate 8-bit binary values [256 kinds of values (basic-values) ranging from 0 to 255 in decimal], such an application is shown simply by way of example, and it is to be understood that the present invention may be applied to any other random number generation device adapted to generate an arbitrary number of bits of values.

FIGS. 1(a) to 1(d) are graphs showing a test result obtained by continuously sampling 1024 of 8-bit values [256 kinds of values (basic-values) ranging from 0 to 255 in decimal] actually generated from the random number generation device, and counting an occurrence frequency (or occurrence number) of each of the basic-values, wherein the horizontal axis represents the basic-values, and the vertical axis represents the counting result (occurrence frequency). 1024 is the number derived by multiplying 256 by 4. Thus, it can be easily understood that each of the basic-values 0 to 255 will occur 4 times on an average, if an output of the random number generation device is true random numbers. In the following description, an operation for or a period of continuously sampling 1024 values from the random number generation device will be defined as "one round"

FIG. 1(e) is a graph showing an average occurrence frequency per round of each of the basic-values values, which was prepared by performing 1000 rounds of samplings from the random number generation device to accumulate an occurrence frequency of each of the basic-values, and dividing the accumulated occurrence frequency by 1000. Actually, operations for the 1000 samplings and the accumulation were automatically performed using a computer.

As is clear from the result in FIG. 1(e), it can be proven that each of the basic-values occurs approximately 4 times on an average. In other words, the sampled output of the random number generation device is true random numbers in view of the fact that the average occurrence frequency is fairly close to 4.

[Random Number Verification I]

Figure 2:
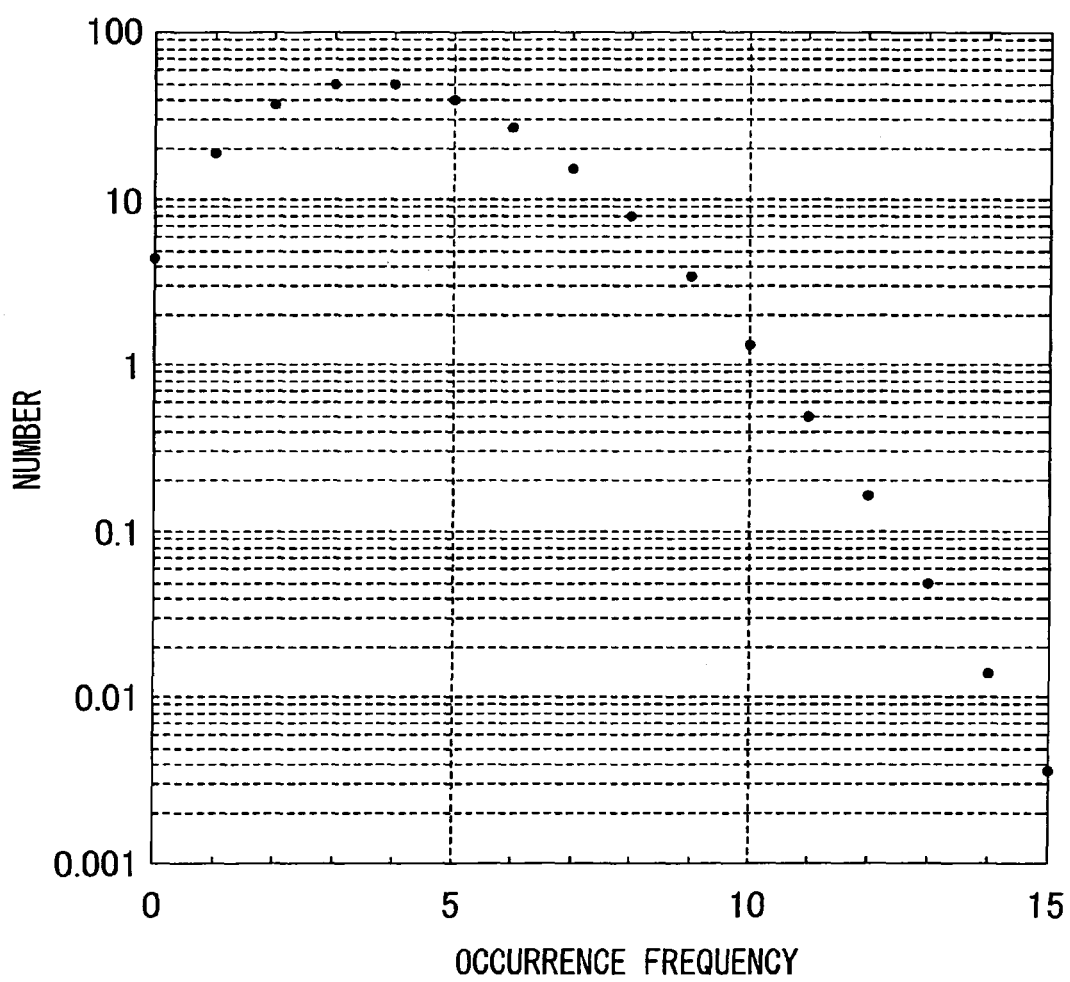
FIG. 2 is a graph, wherein the horizontal axis represents the occurrence frequency on the vertical axis of the graph in FIGS. 1(a) to 1(d), and the vertical axis represents the number of the basic-values (how many of 256 exist) corresponding to each of the occurrence frequencies on the horizontal axis.

FIG. 2 is a graph, wherein the horizontal axis represents the occurrence frequency on the vertical axis of the graph in FIGS. 1(a) to 1(d), and the vertical axis represents the number of the basic-values (how many of 256 exist) corresponding to the occurrence frequencies on the horizontal axis (it should be noted that a logarithmic scale is used for the vertical axis). In other words, FIG. 2 shows the result of addition of respective values on the vertical axis in the graphs of FIGS. 1(a) to 1(b) in the horizontal axis direction. That is, FIG. 2 shows a distribution curve obtained by counting the number of non-occurring values (zero on the vertical axis in FIG. 1, or how many black circles on the horizontal axis are there?), the number of the basic-values occurring once, the number of the basic-values occurring 2 times, the number of the basic-values occurring 3 times, - - - . Actually, the distribution curve was prepared by repeatedly performing one round of samplings 100,000 times (actually based on an automatic sampling using a computer), accumulating occurrence frequencies, dividing each of the accumulated occurrence frequencies by 100,000, and plotting the obtained averages.

As seen in the graph of FIG. 2 in detail, for example, looking at a position where the horizontal axis value is "0", the corresponding vertical axis value is about "4.9". This means that the number of non-occurring basic-values is about 4.9 per round on an average. In fact, when the number of non-occurring basic-values is counted in each of the rounds in FIGS. 1(a) to 1(d), the numbers of non-occurring basic-values in FIGS. 1(a), 1(b), 1(c) and 1(d) are, respectively, 5, 6, 7 and 4, and an average of them is 5.5. Despite only 4 FIGS. 1(a) to 1(d), this average is fairly close to the above average "4.9".

Further, looking at a position where the horizontal axis value is "4" or the curve has a peak, the corresponding vertical axis value is about "50". This means that the number of ones occurring 4 times in the 256 kinds of values (basic-values) is about 50 per round on an average. This fact that the curve has a peak at the position where the horizontal axis value is "4"

corresponds to the fact that an average in FIG. 1(e) is "4". Furthermore, looking at a position where the horizontal axis value is "10", the corresponding vertical axis value is about "1.4". This means that the number of ones occurring 10 times in the 256 kinds of values (basic-values) is about 1.4 per round on an average. When all of the values on the vertical axis corresponding to the values on the horizontal axis are added together, there will be 256 kinds of values. This corresponds to the fact that there are 256 kinds of values output as random numbers.

The result illustrated in FIG. 2 is a distribution curve under the condition that the random number generation device accurately outputs random numbers. If a problem, such as increase in a probability of a specific one of the basic-values occurring or a bias in the occurrence frequency, occurs due to a malfunction of the random number generation device or a malicious or wrongful manipulation of the random number generation device, the output of the random number generation device will deviate from the distribution curve illustrated in FIG. 2. Specifically, if only an occurrence frequency of a specific one of the 256 kinds of values (basic-values) is outstandingly increased in a certain round, each of the occurrence frequencies of the remaining basic-values will be reduced. Thus, only a specific one of the basic-values can be monitored to check whether it deviates from the distribution curve in FIG. 2, so as to inspect whether the random number generation device is normally operated, or perform a so-called "random number verification".

The above is a fundamental principle of the Random Number Verification I.

The Random Number Verification I will be described in more detail below. The following description will be made with a focus on one example where the horizontal axis value is "0" in FIG. 2. The value "0" on the horizontal axis means that an occurrence frequency per round of a certain one of the basic-values is zero, and the corresponding value on the vertical axis indicates the most probable number (about 4.9) of the basic-values having an occurrence frequency of zero. If an occurrence frequency of a specific one of the basic-values is outstandingly increased due to occurrence of a problem in the random number generation device, the number of the basic-values having an occurrence frequency of zero must be sharply increased beyond the above number 4.9. Thus, for example, one round of samplings can be performed to count the number of non-occurring ones in the basic-values and compare the counted number with a predetermined threshold greater than "4.9". In this case, if the counted value is greater than the predetermined threshold, it can be determined that a certain problem has occurred in the random number generation device.

On the other hand, the random numbers originally have various values randomly generated, and statistical variations are inevitably involved therein. Thus, even if the random number generation device is normally operated, it is highly likely that the number of non-occurring basic-values becomes greater than 4.9 when only a specific one of the rounds is observed. In this case, if the predetermined threshold is set at a value which is not much greater than 4.9, and the random number generation device is determined to be abnormal, based on the fact that the number of the non-occurring basic-values is greater than the threshold, it is likely to be determined that the device is being abnormally operated, even though it is actually being normally operated.

Figure 3:
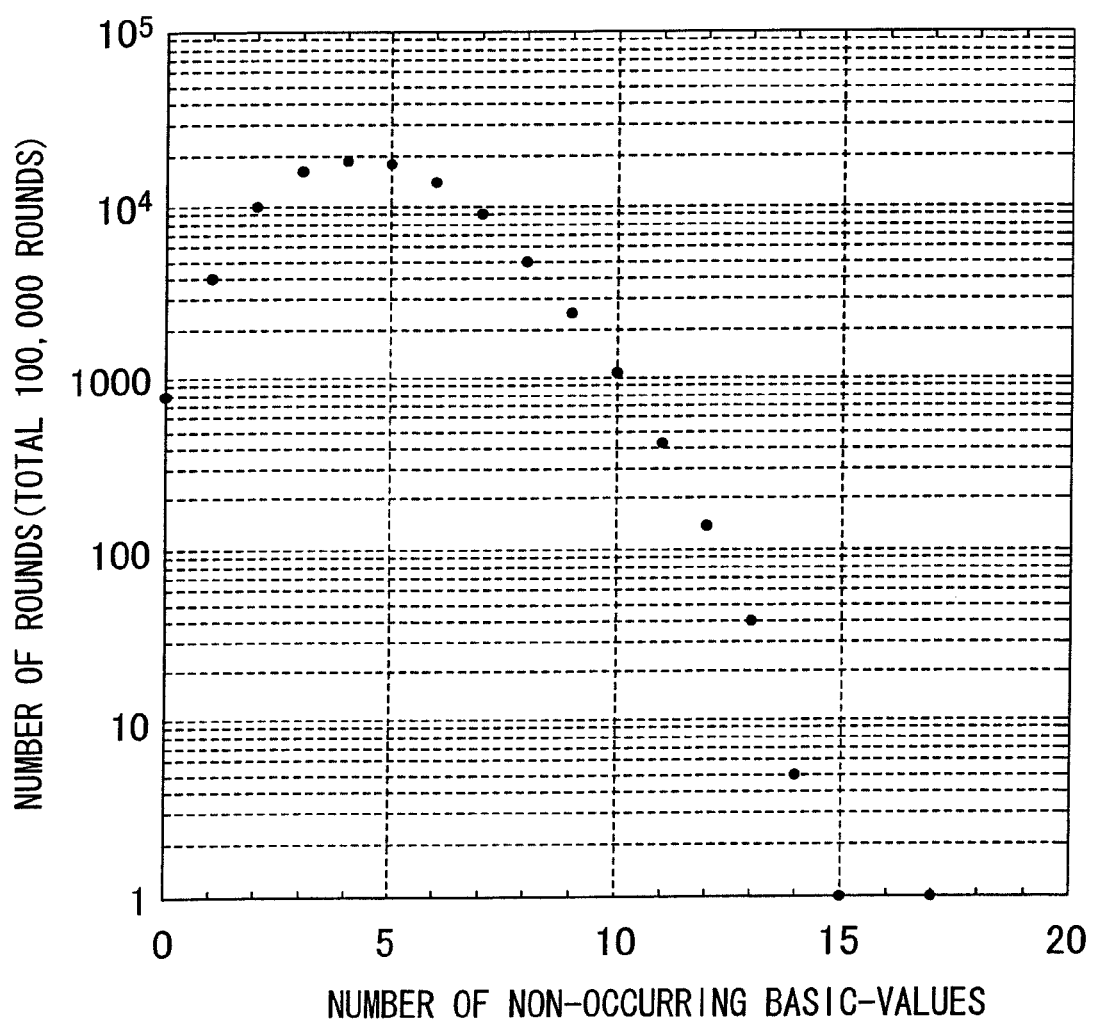
FIG. 3 is a graph showing a distribution curve obtained by 100,000 rounds of samplings (one round: 1024 samplings), wherein the horizontal axis represents the number of non-occurring ones in the 256 kinds of values (basic-values), and the vertical axis represents how many of the 100,000 rounds have one or more of the non-occurring basic-values.

In this connection, a logical guideline for clarifying an excess level of the threshold relative to the number of non-occurring basic-values, which serves as a benchmark for determining the presence or occurrence of inadequacy or abnormality, will be described below. FIG. 3 shows a distribution curve obtained by 100,000 rounds of samplings (one round: 1024 samplings), wherein the horizontal axis represents the number of non-occurring ones in the 256 kinds of values (basic-values), and the vertical axis represents how many of the 100,000 rounds have the non-occurring basic-values. For example, looking at a position where the horizontal axis value is "4", the corresponding vertical axis value is about 19,000. This means that when the number of the non-occurring basic-values is 4, the frequency is about 19,000 in 100,000 samplings. The distribution curve has a peak at a position where the horizontal axis value is about 4.9. This corresponds to the fact that the vertical axis value corresponding to zero on the horizontal axis in FIG. 2 is about 4.9. The reason for this is that the graph in FIG. 3 is prepared with a focus on a position where the horizontal axis value is "0" in FIG. 2, or the vertical axis of the graph in FIG. 2, as mentioned above.

A graph similar to that in FIG. 3 can be prepared even with a focus on a position in FIG. 2 other than the position where the horizontal axis value is "0". It should be noted that the following discussion is also applicable to this case. For example, when a graph similar to that in FIG. 3 is prepared with a focus on a position where the horizontal axis value in the graph of FIG. 2 is "10", or a frequency of "10", the obtained graph is an occurrence frequency distribution curve indicating the number of ones occurring 10 times in the 256 kinds of values (basic-values). A shape of the distribution curve can be estimated from the graph in FIG. 2. For example, the curve has a peak at a position where the horizontal axis value is about "1.5".

In the same manner as above, an occurrence frequency distribution curve indicating the number of ones occurring 8 times in the basic-values can be obtained by focusing on a position where the horizontal axis value is "8". This curve has a peak at a position where the horizontal axis value is about "7.5". The number of ones occurring 8 times in the basic-values is 9, 6, 9 and 5, respectively, in the graphs of FIGS. 1(a), 1(b), 1(c) and 1(d). Thus, it can be intuitively known that an average of about 7.5 is reasonable.

Figure 4:
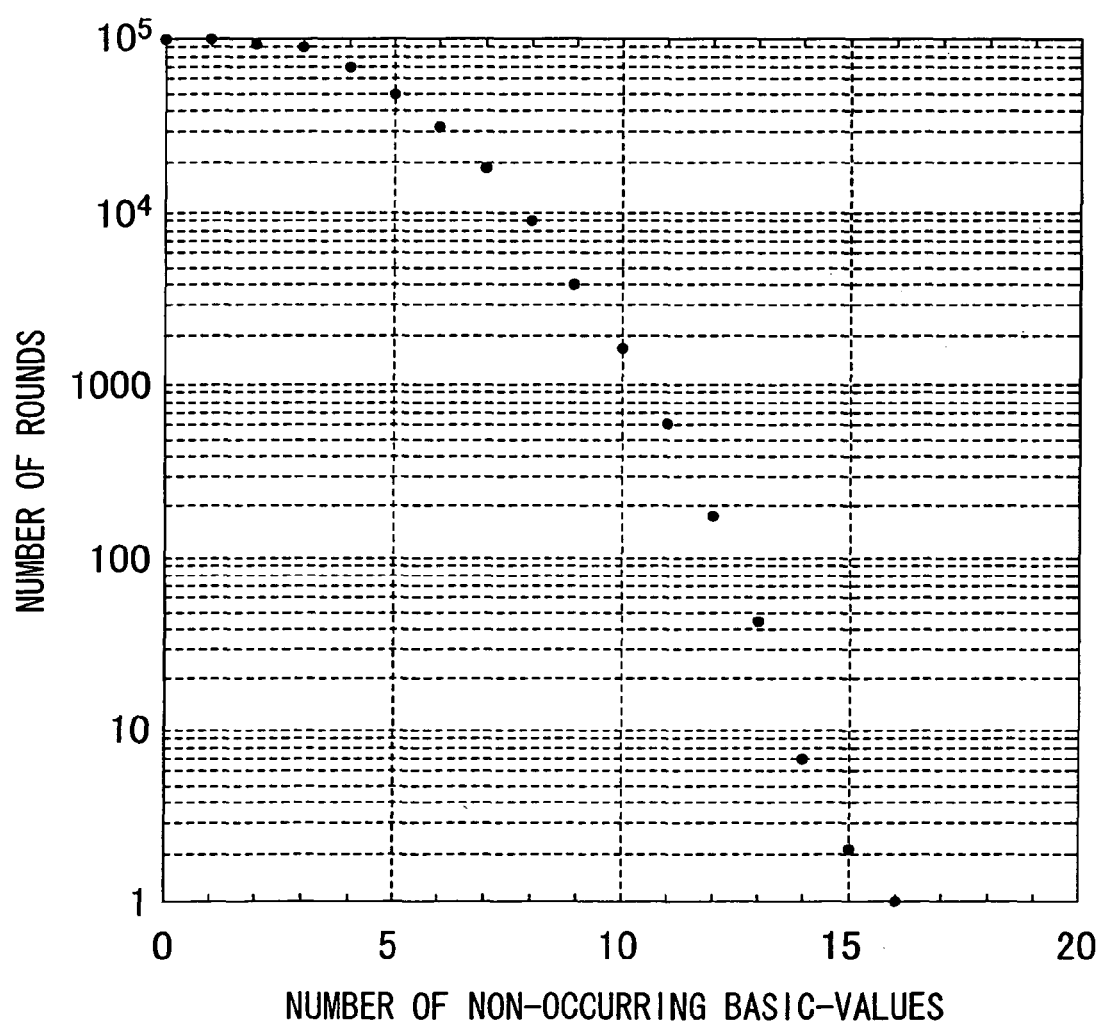
FIG. 4 is a graph obtained by adding all plotted values greater than a certain value on the horizontal axis in the horizontal axis directions.

FIG. 4 is a graph obtained by adding all plotted values greater than a certain value on the horizontal axis in the horizontal-axis direction. That is, this graph is intended to represent the number of rounds where the number of non-occurring ones in the 256 kinds of values (basic-values) becomes equal to or greater than the number of the non-occurring basic-values on the horizontal axis, in 100,000 rounds.

For example, looking at a position where the horizontal axis value is "0", the corresponding vertical axis value is 100,000. This shows the obvious result that the number of non-occurring ones in the basic-values over all the rounds is zero or more. Looking at a position where the horizontal axis value is "5", the corresponding vertical axis value is about "50,000". This means that the number of rounds where the number of non-occurring ones is 5 or more in the 256 kinds of values (basic-values) is about "50,000" in 100,000 rounds. Further, looking at a position where the horizontal axis value is "15" in FIG. 4, the corresponding vertical axis value is "2." This means that the number of rounds where the number of non-occurring ones is 15 or more in the 256 kinds of values (basic-values) is "2" in 100,000 rounds.

More specifically, this means that, when a random number generation device is determined to be abnormal, based on a verification result that the number of non-occurring ones in the 256 kinds of values (basic-values) is, for example, 15 or more, a probability that no abnormality or problem actually occurs in the random number generation device is 2/100,000. That is, when 100,000 random number generation devices (e.g. IC-type random number generation devices) are produced in a random-number-generation-device manufacturing plant, and the products are determined to be defective if the number of non-occurring ones in the 256 kinds of values (basic-values) is "15" or more, a risk rate that an actually normal one of the products is determined to be defective is 2/100,000. This risk rate is a fairly small value. Thus, it can be said that the above example demonstrates the high reasonableness of the determination that a random number generation device is defective in view of the reason that "15 or more" values in 256 kinds of values are found which do not occur at all.

If it is required to detect a defective product with a higher degree of accuracy, the threshold for determination on whether a product is defective may be set at a value less than "15", for example "10". In this case, while some normal products are likely to be erroneously determined to be defective, a risk rate of shipping a defective product can be reduced. As mentioned above, this embodiment makes it possible to logically set a reasonable threshold for determination on whether a product is defective.

Further, each of the IC-type random number generation devices may be successively subjected to the above verification process plural times, for example, 2 times. In this case, a probability that the number of non-occurring basic-values becomes "15" or more in the two verification processes will be a square value of 2/100,000 or a value substantially equal to zero, and such an operation is impractical or unprofitable. Thus, practically speaking, only a product having the number "15" or more of non-occurring basic-values may be re-subjected to the same verification process. In this case, if the product has the number "15" or more of non-occurring basic-values in the second verification, it can be determined to be absolutely defective. Thus, the determination can be performed with enhanced certainty or credibility.

While the above embodiment has been described in connection with an example focusing on the number of non-occurring basic-values, the Random Number Verification I is not limited to the example, but may be instead designed with a focus on the number of ones in the basic-values which occur an arbitrary number of times (e.g. p times). In this case, an appropriate threshold may be set relative to this number to determine that a product has a problem if the number is greater or less than the threshold.

The Random Number Verification I is characterized by focusing on fundamental characteristics of authentic random numbers. Thus, this verification method can be applied to a random number generation device capable of generating substantially authentic random numbers, as disclosed in the aforementioned International Application PCT/JP03/01100, to obtain more profitable effects.

Figure 5:
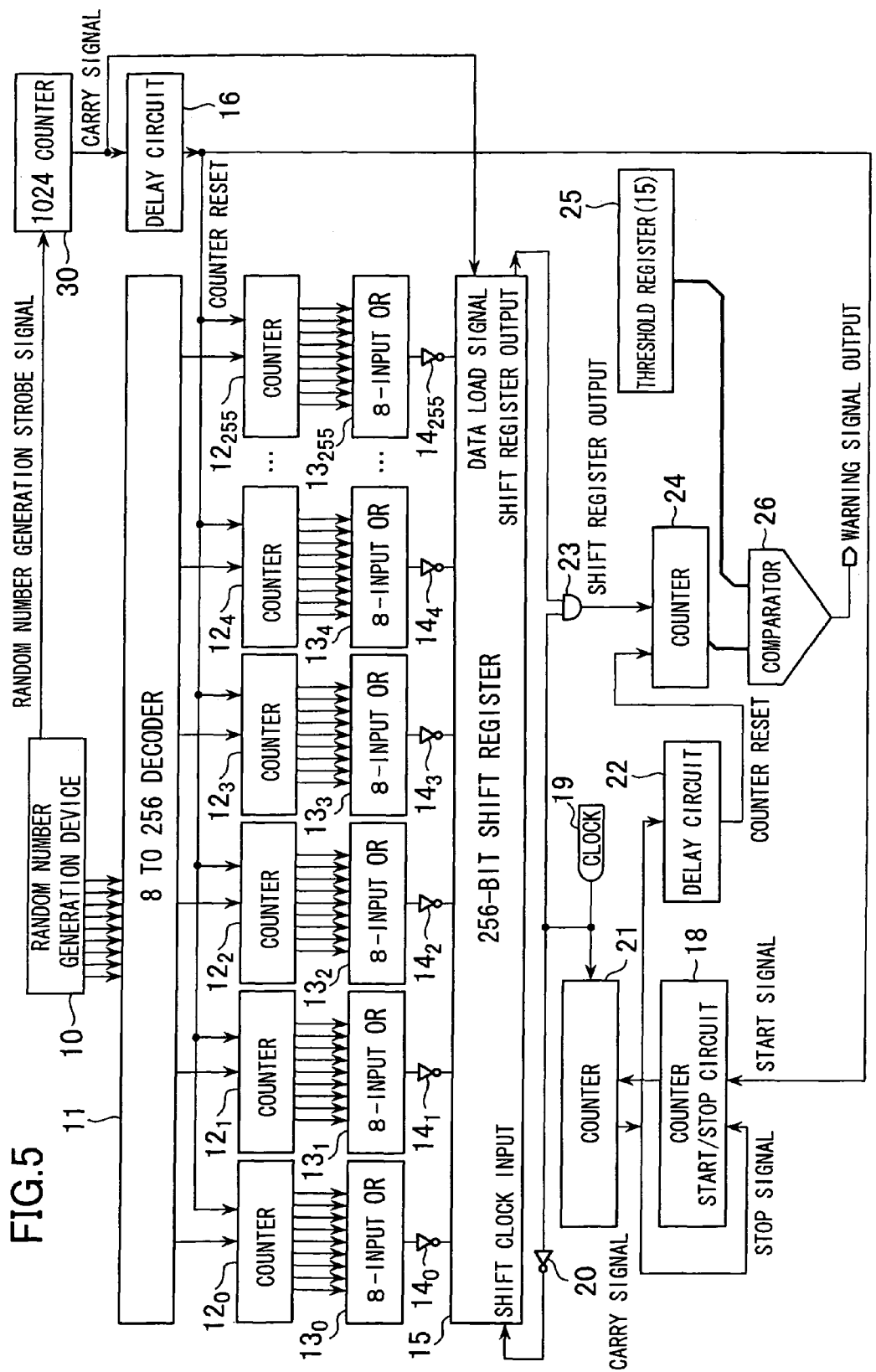
FIG. 5 is a fragmentary circuit diagram showing a random number verification apparatus according to Random Number Verification I.

FIG. 5 is a fragmentary circuit diagram showing a hardware-based random number verification apparatus according to the concept of the Random Number Verification I. In FIG. 5, a random number generation device 10 is an object to be subjected to the random number verification. The following description will be made on the assumption that the random number generation device 10 is designed to output 8-bit binary random numbers.

The random number generation device 10 is operable to output 8-bit random numbers, and outputs a strobe signal every time one random number is generated. This strobe signal is supplied to a counter 30 to increment the counter 30. The counter 30 is provided as a means to count 1024 samplings for one round. Specifically, the counter 30 is designed to be incremented up to 1024 counts, and then reset by a subsequently incoming strobe signal and simultaneously output a carry signal.

Each of the random 8-bit binary numbers output from the random number generation device 10 is sent to a decoder 11, and the decoder 11 decodes the 8-bit binary number to either one of 256 kinds of integral values (0 to 255). 256 output lines of the decoder 11 are connected, respectively, to input terminals of 256 corresponding 8-bit counters $12_0$ to $12_{255}$. A value decoded by the decoder 11 is output as a logical value "1" from an output line corresponding to the decoded value, and sent to a corresponding one of the counters $12_0$ to $12_{255}$ to increment the corresponding counter.

An 8-bit output from each of the counters $12_0$ to $12_{255}$ is sent to a corresponding one of 8-input OR circuits $13_0$ to $13_{255}$. Each of the 8-input OR circuits $13_0$ to $13_{255}$ is designed to output a logical value "0" only when all of the 8-bit inputs thereto are a logical value "0", and a logical value "1" in another case or when at least one of the 8-bit inputs is a logical value "1". Thus, only the 8-input OR circuit corresponding to a non-occurring one in the 256 kinds of values (basic-values) will output a logical value "0". Respective logical value outputs from the 8-input OR circuits $13_0$ to $13_{255}$ are inverted, respectively, by corresponding inverters $14_0$ to $14_{255}$, and sent to a 256-bit shift register 15. Thus, among 256 of the inputs to the 256-bit shift register 15, only one or more inputs corresponding to a non-occurring one in the 256 kinds of values (basic-values) have a logical value "1". The number of the inputs having the logical value "1" corresponds to the number of non-occurring ones in the basic-values over one round or 1024 samplings.

When samplings for one round are completed and the aforementioned carry signal is generated, the generated carry signal is sent as a data load signal to the shift register 15. In response to the entered carry signal, the shift register 15 loads all inputs at this moment.

This carry signal is also sent to a delay circuit 16, and formed as a counter reset signal through the delay circuit 16. Then, the counter reset signal is sent to each of the counters $12_0$ to $12_{255}$ to reset each count value of these counters to zero. The delay circuit 16 is provided as a means to prevent the counters $12_0$ to $12_{255}$ from being reset before the shift register 15 loads the count values of the counters $12_0$ to $12_{255}$.

Then, a shift operation in the shift register 15 is executed. The aforementioned carry signal is formed as a start signal through the delay circuit 16, and this start signal is sent to a start/stop circuit 18 to initiate the shift operation. Specifically, when the start signal is sent to the start/stop circuit 18, a 256-count counter 21 will start counting a clock signal from a clock 19.

The shift register 15 is operable, every incoming of a shift clock being formed by inverting the clock signal from the clock 19 through an inverter 20, to shift 256-bit data stored thereon rightward one bit-by-one bit, and send rightmost data (originally a logical value of the inverter $14_{255}$) from its output terminal to one of two input terminals of an AND circuit 23. A clock signal (logical value "1") of the clock 19 is sent to the other input terminal of the AND circuit 23. Thus, an output from the shift register 15 directly occurs at an output terminal of the AND circuit 23. When the output from the AND circuit 23 is a logical value "1", a counter 24 will be incremented. A count value of the counter 24 at a time when the shift operation has been repeatededly carried out 256 times corresponds to the number of the logical values "1" contained in 256-bit data loaded when the data load signal is sent to the shift register 15. That is, this count value of the counter 24 indicates the number of non-occurring ones in the basic-values over one round or 1024 samplings.

When the counter 21 counts the clock signal from the clock 19 up to 256, it outputs a carry signal. This carry signal is sent to the count start/stop circuit 18 and to the counter 24 through the delay circuit 22. In response to receiving this carry signal, the count start/stop circuit 18 outputs a stop signal. When this stop signal is sent to the counter 21, the counter 21 stops the count operation. Further, when the carry signal passing through the delay circuit 22 is sent to the counter 24, the counter 24 is rested. Thus, the count operation for counting the number of non-occurring basic-values is completed.

As one example, a threshold of "15" is set in a threshold register 25. A comparator 26 is operated to compare the count value of the counter 24 with the threshold set in the threshold register 25, and generate a warning (alarm) signal at a time when the counter value reaches the predetermined threshold "15".

This warning signal may be continuously monitored to detect the generation of the warning signal so as to be able to know when there is a significantly high possibility of some problem occurring in the random number generation device 10. The circuit illustrated in FIG. 5 is designed to repeatedly perform the above operation so as to continuously verify random numbers output from the random number generation device 10.

Figure 6:
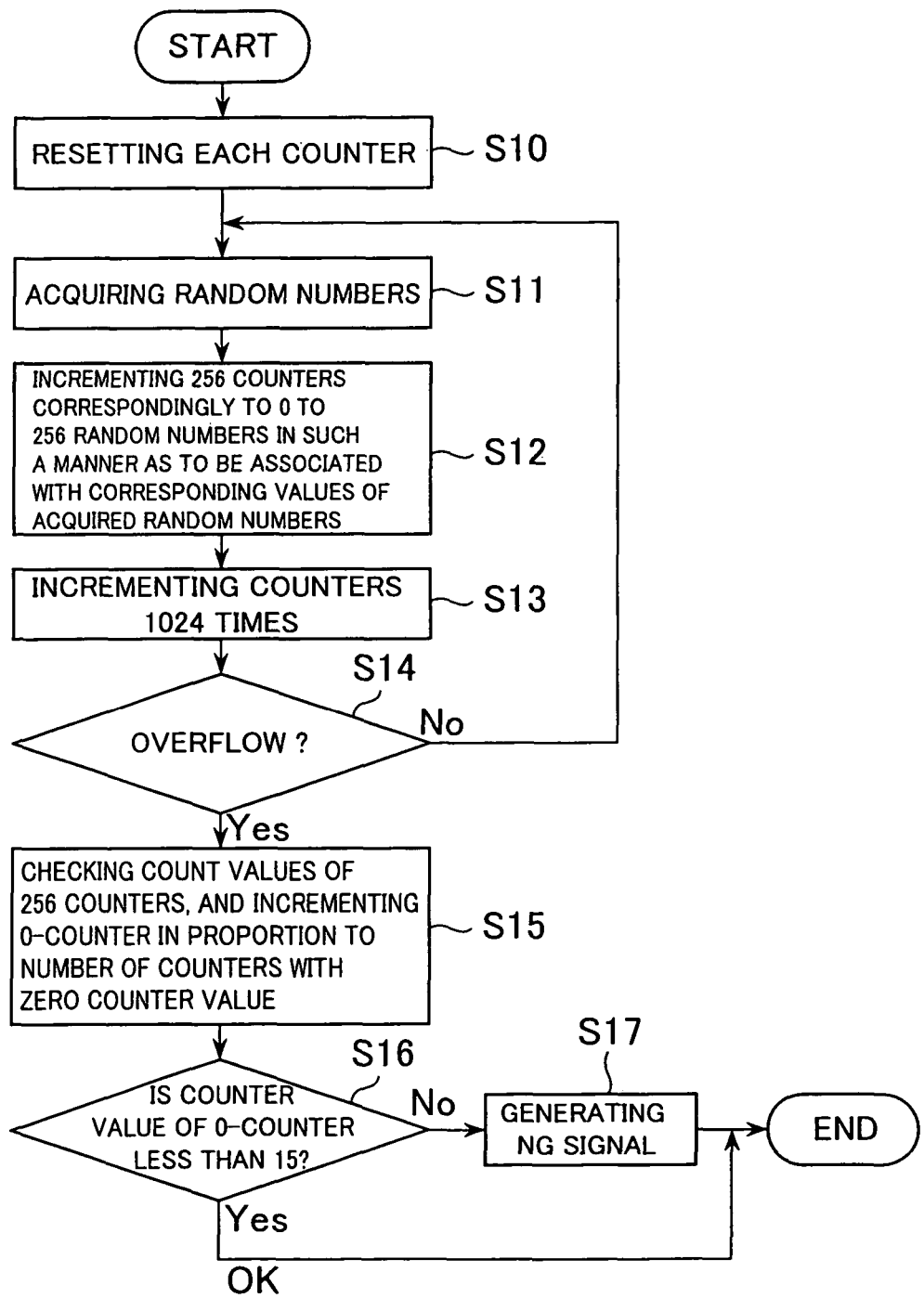
FIG. 6 is a flowchart showing one example of a process for implementing Random Number Verification I on a computer-software basis.

FIG. 6 is a flowchart showing one example of a process for implementing the Random Number Verification I on a computer-software basis. While the following description will be made on the assumption that a random number generation device to be subjected to the verification is designed to output 8-bit random numbers, it is understood that this description is given simply by way of example.

Firstly, a plurality of prepared counters are reset (Step S10). Then, 8-bit values output as random numbers are sequentially acquired (Step S11), and 256 counters provided correspondingly to 256 kinds of values (basic-value) ranging from 0 to 255 are incremented in such a manner as to be associated with corresponding values of the acquired random numbers (Step S12). This operation is continuously carried out until one round (1024 samplings) is completed (Steps S13 and S14). Then, during this operation, the number of ones having a count value of "0" in the 256 counters is counted by incrementing another associated counter (Step S15). Then, a final count value of the associated counter is compared with the threshold "15". When the count value is equal to or greater than "15", it is determined that the random number generation device has some problem, and an NG signal (alarm signal) is generated (Step S17).

[Random Number Verification II]

Figure 7:
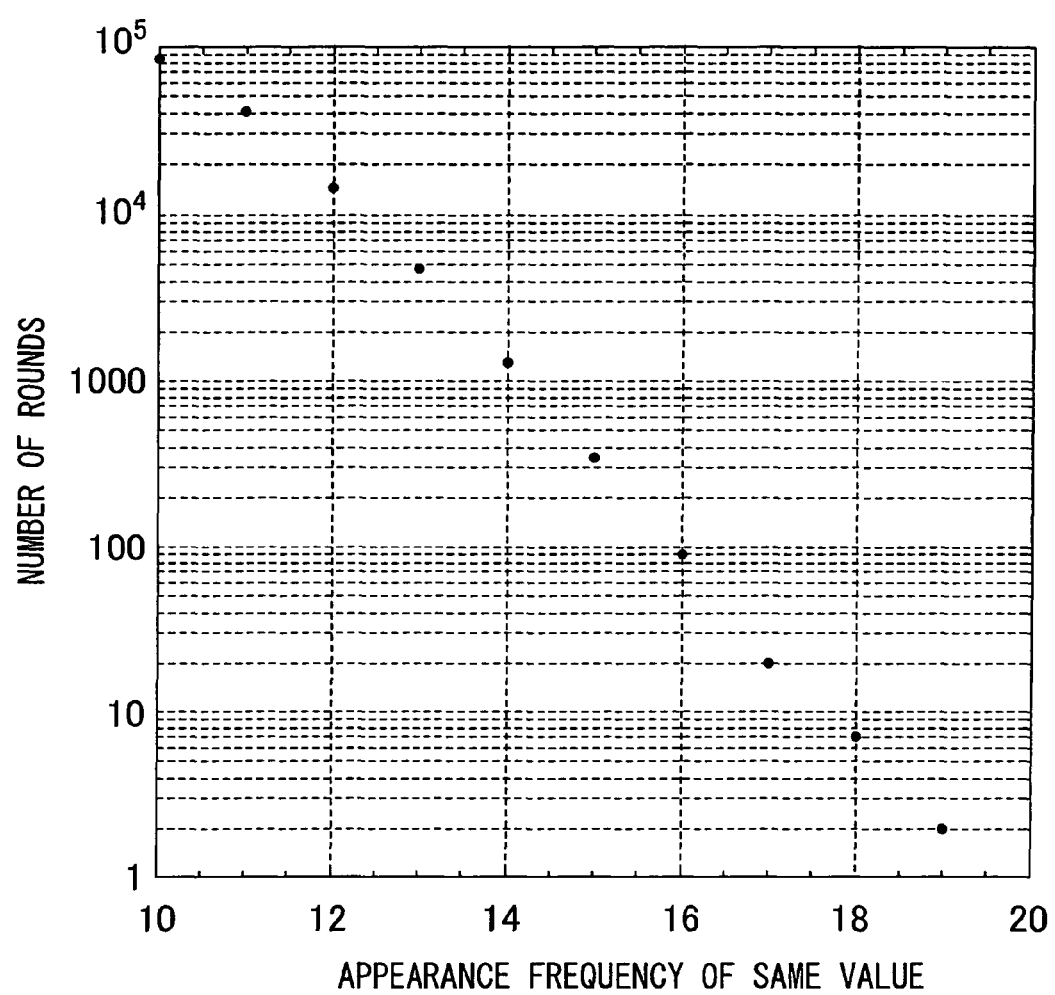
FIG. 7 is a graph showing a distribution curve, wherein the horizontal axis represents the number of times any identical value in the 256 kinds of values occurs, and the vertical axis represents the number of rounds in the 100,000 rounds which include the values which occur a specified number of times on the horizontal axis.

Random Number Verification II will be described below. FIG. 7 shows a distribution curve, wherein the horizontal axis represents how many times a specific one of the 256 kinds of values (basic-values) occur per one round or 1024 samplings, and the vertical axis represents how many of 100,000 rounds have the specific basic-value. FIG. 7 illustrates only a part of the distribution curve corresponding to a horizontal axis value of 10 or more. For example, looking at a position where the horizontal axis value is "10" in FIG. 7 (or on the vertical axis), the corresponding vertical axis value is about "750,000". This means that the number of rounds where a specific one (or the same one) of the basic-values occurs 10 times in one round (1024 samplings) is about 75,000 per 100,000 rounds. Referring to FIGS. 1(a) to 1(d) showing 4 rounds, the number of specific ones occurring 10 times in the basic-values is 3, zero, 1 and 1, respectively, in FIG. 1(a), FIG. 1(b), FIG. 1(c) and FIG. 1(d). Thus, the number of rounds where a specific one of the basic-values occurs 10 times in one round is 3 in 4 rounds.

In other words, when only one round is observed, a probability that a specific one of the basic-values occurs 10 times in the round is about ¾.

Further, looking at a position where the horizontal axis value is "11" in FIG. 7, the corresponding vertical axis value is about "40,000." This means that the number of rounds where a specific one (or the same one) of the basic-values occurs 11 times in one round is about 40,000 per 100,000 rounds. Thus, a probability that a specific one of the basic-values occurs 11 times in one round is about ⅖. Referring to FIGS. 1(a) to 1(d) showing 4 rounds, the number of specific ones occurring 11 times in the basic-values is zero, 1, zero and 3, respectively, in FIG. 1(a), FIG. 1(b), FIG. 1(c) and FIG. 1(d). Thus, the number of rounds where a specific one of the basic-values occurs 11 times in one round is 2 in 4 rounds.

Further, looking at a position where the horizontal axis value is "19" in FIG. 7, the corresponding vertical axis value is "2". This means that the number of rounds where a specific one (or the same one) of the basic-values occurs 19 times in one round is 2 per 100,000 rounds. That is, a probability that a specific one of the basic-values occurs 19 times in one round is 2/100,000 or an extremely low probability of 0.002%. Referring to FIGS. 1(a) to 1(d) showing 4 rounds, there is no round where a specific one (or the same one) of the basic-values occurs 19 times.

From the matters mentioned above, a probability that a specific one of the basic-values occurs plural times in one round is drastically reduced as the number of times of occurrence (occurrence frequency) increases. Thus, for example, if an occurrence frequency of a specific value in samplings for one round is outstandingly high, it can be considered that there is a high possibility of occurrence of some problem in a random number generation device due to wrongful manipulation, malfunction or the like, and a random number verification can be performed by utilizing this phenomenon. Specifically, a certain threshold is preset relative to an occurrence frequency, and, when an occurrence frequency of any one of the 256 kinds of values (basic-values) becomes greater than the threshold, a random number generation device is determined to be defective or abnormal.

However, even if a random number generation device is normally operated, it is likely that a specific value occurs a number of times due to statistical variations, if only one specific round is observed. Thus, while the reliability in eliminating defective random number generation devices can be increased by setting the threshold at a lower value, an excessively low threshold is highly likely to cause a problem about elimination of normal random number generation devices. On the other hand, while a possibility of elimination of normal random number generation devices can be reduced by setting the threshold at a higher value, an excessively high threshold causes poor reliability in eliminating defective random number generation devices. Thus, the threshold should be set in consideration of an intended propose of a target random number generation device and a required level of reliability in eliminating defective random number generation devices.

As one example, if "19 times" (horizontal axis value "19" in FIG. 7) is set as the threshold, a probability that a specific one of the basic-values occurs 19 times in one round when random numbers are normally generated is 2/100,000, as mentioned above. This means that, in a process for verifying random number generation devices using the above determination technique, two normal random number generation devices can be determined to be defective, among 100,000 random number generation devices.

In this case, if one random number generation device is successively subjected to this verification process plural times, for example, two times, a probability that a specific value occurs 19 times in the two verification processes will be a square value of 2/100,000 or a value substantially equal to zero, and such an operation would be impractical or unprofitable.

Thus, practically speaking, only a product having an occurrence frequency of 19 or more may be re-subjected to the same verification process. In this case, if the product has an occurrence frequency of 19 or more in the second verification, it can be determined to be absolutely defective.

This determination technique may be applied to verification in factory shipment of random number generation devices (factory verification). Further, the determination technique may be used in such a manner that a software-based or hardware-based circuit implementing this verification method may be incorporated in a random number generation device, and the random number verification is continuously performed during activation of the random number generation device.

This Random Number Verification II can also be applied to a random number generation device capable of generating substantially authentic random numbers, as disclosed in the aforementioned International Application PCT/JP03/01100, to obtain better effects.

Figure 8:
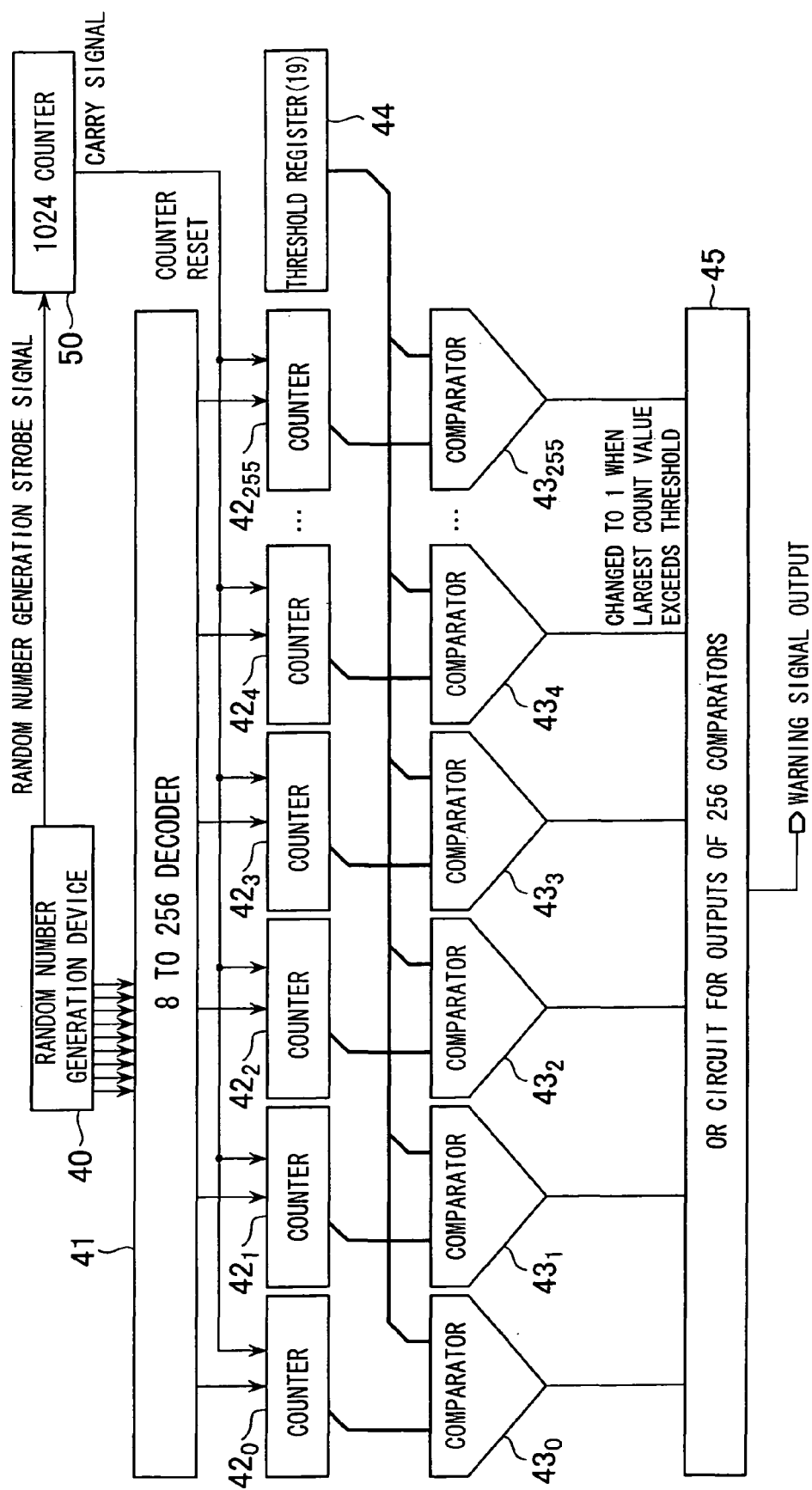
FIG. 8 is a fragmentary circuit diagram showing a random number verification apparatus according to Random Number Verification II.

FIG. 8 is a fragmentary circuit diagram showing a hardware-based random number verification apparatus according to Random Number Verification II. In FIG. 8, a random number generation device 40 is an object to be subjected to the random number verification. The following description will also be made on the assumption that the random number generation device 40 is designed to output 8-bit binary random numbers, as with the random number generation device 10 in FIG. 5

The random number generation device 40 is operable to output 8-bit random numbers, and output a strobe signal every time one random number is generated. This strobe signal is supplied to a counter 50 to increment the counter 50. The counter 50 is provided as a means to count 1024 samplings for one round. Specifically, the counter 50 is designed to be incremented up to 1024 counts, and then reset by a subsequently incoming strobe signal and simultaneously output a carry signal.

Each of the random 8-bit binary numbers output from the random number generation device 40 is sent to a decoder 41, and the decoder 41 decodes the 8-bit binary number to any one of 256 kinds of integral values (0 to 255). 256 output lines of the decoder 41 are connected, respectively, to input terminals of 256 corresponding 8-bit counters $42_0$ to $42_{255}$. A value decoded by the decoder 41 is output as a logical value "1" from an output line corresponding to the decoded value, and sent to a corresponding one of the counters to increment the corresponding counter. Thus, at a time when a sampling operation for one round is completed, each of the counters has a count value indicative of how many times each of the values corresponding to 0 to 255 has occured.

An 8-bit output from each of the counters $42_0$ to $42_{255}$ is sent to a corresponding one of comparators $43_0$ to $43_{255}$. Each of the comparators $43_0$ to $43_{255}$ is operable to compare a value sent from a corresponding one of the counters with a threshold pre-set in a register 44. In this embodiment, a threshold "19" is set in the register 44. As mentioned above, this threshold is used such that, when an occurrence frequency of any one of the 256 kinds of values (basic-values) becomes equal to or greater than the threshold, it is determined that a problem has occurred in the target random number generation device.

Each outputs from the comparators $43_0$ to $43_{255}$ is normally a logical value "0", and becomes "1" when a value output from a corresponding one of the counters is equal to or greater than the threshold "19" set in the resister 44. The outputs from the comparators $43_0$ to $43_{255}$ are sent, respectively, to corresponding input terminals of an OR circuit 45. Thus, when at least one of the 256 comparators has a logical value "1", an output from the OR circuit 45 will become a warning signal.

This warning signal may be continuously monitored to detect the generation of the warning signal so as to know whether there is a significantly high possibility of occurrence of some problem in the random number generation device 40. The circuit illustrated in FIG. 8 is designed to repeatedly perform the above operation so as to continuously verify random numbers output from the random number generation device 40. When the carry signal is generated in response to completion of samplings for one round, this signal is sent to each of the counters $42_0$ to $42_{255}$. Thus, each count value of these counters is reset to zero.

Figure 9:
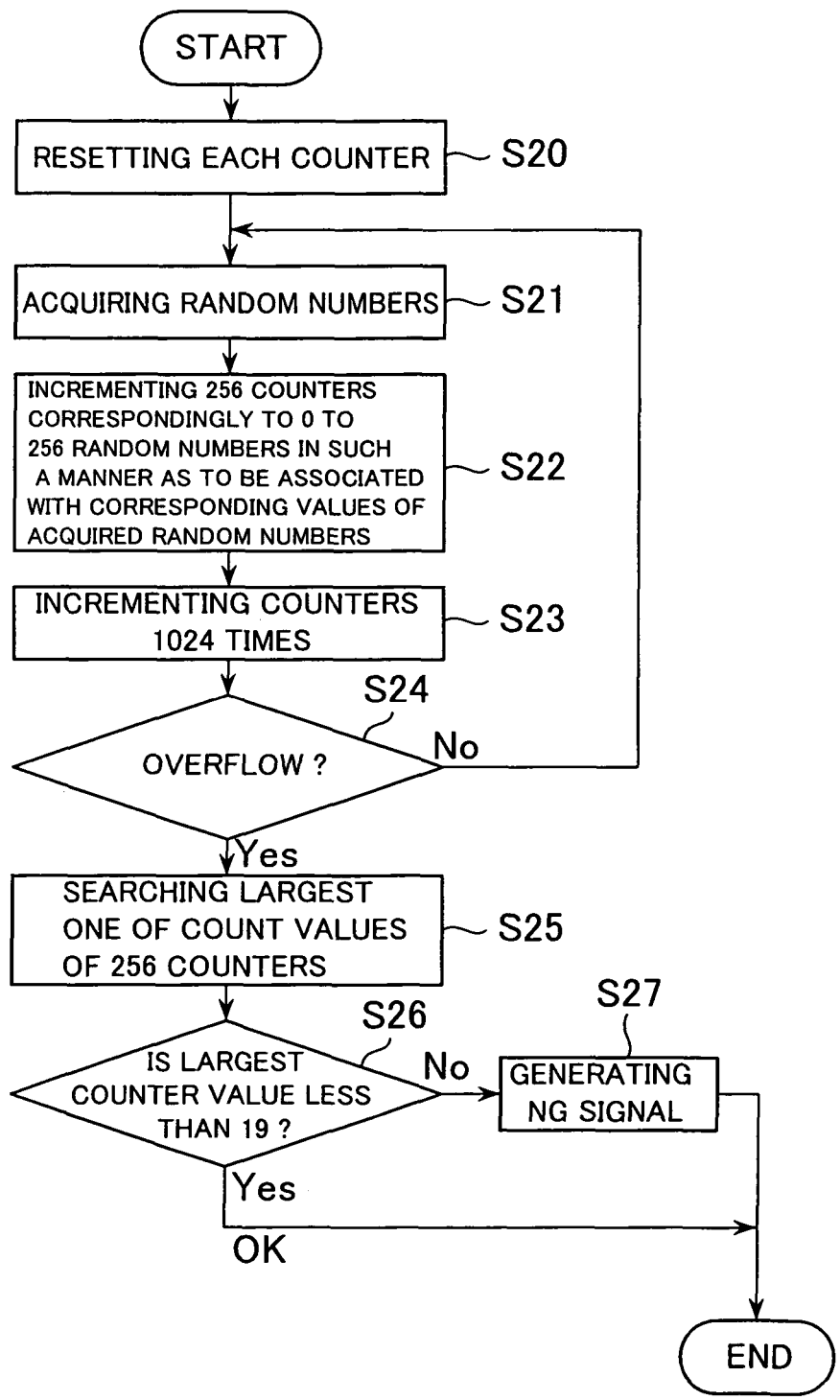
FIG. 9 is a flowchart showing one example of a process for implementing a random number verification method according to Random Number Verification II, on a computer-software basis.

FIG. 9 is a flowchart showing one example of a process for implementing the Random Number Verification II on a software basis. While the following description will be made on the assumption that a random number generation device to be subjected to the verification is designed to output 8-bit random numbers, it is understood that this description is given simply by way of example.

Firstly, a plurality of prepared counters are reset (Step S20). Then, 8-bit values output as random numbers are sequentially acquired (Step S21), and 256 counters provided correspondingly to 256 kinds of values (basic-value) ranging from 0 to 255 are incremented in such a manner as to be associated with corresponding values of the acquired random numbers (Step S22). This operation is continuously carried out until one round (1024 samplings) is completed (Steps S23 and S24). Then, during this operation, the largest one of the count values of the 256 counters is searched (Step S25). Then, the largest count value is compared with the threshold "19" (Step S26). When the largest count value is less than "19", it is determined that the random number generation device is normal. If the largest count value is equal to or greater than "19", it will be determined that the random number generation device has some problem, and an NG signal (alarm signal) is generated (Step S27).

[Random Number Verification III]

Random Number Verification III will be described below. In random number generation devices, particularly a random number generation device designed to generate random numbers based on thermal noise from a thermal noise element, the number of random numbers to be generated per unit time exhibits a Gaussian distribution having a center defined by an average value thereof and a given variance, depending on settings of a circuit constant and/or a threshold in a waveform shaping circuit. That is, it is proven that, while the number of random numbers to be generated per unit time is not always constant, it generally falls within a certain range.

However, if a random number generation device has some problem, such as a wrongful manipulation thereof, or occurrence of a malfunction, it is highly likely that the number of random numbers to be generated per unit time will be largely varied. For example, in a random number generation device about which it is known that the number of random numbers to be generated for 1 second is 10,000 on an average, and falls substantially within the range of 10,000±1,000 in all cases, if 20,000 random numbers are generated within 1 second, or only 5000 random numbers are generated within 1 second, it is highly likely that some problem occurs in the random number generation device.

In view of the above, the number of random numbers to be generated within a given time (e.g. 1 second) by a normal random number generation device is figured out in advance, and two appropriate numbers greater and less than the predetermined number are set, respectively, as upper and lower limits. Then, the number of random numbers to be generated within the given time by a random number generation device is continuously monitored, and, when the number of random numbers deviates beyond the upper or lower limit, it can be determined that some problem occurs in the random number generation device. This is a fundamental principle of the Random Number Verification III.

Figure 10:
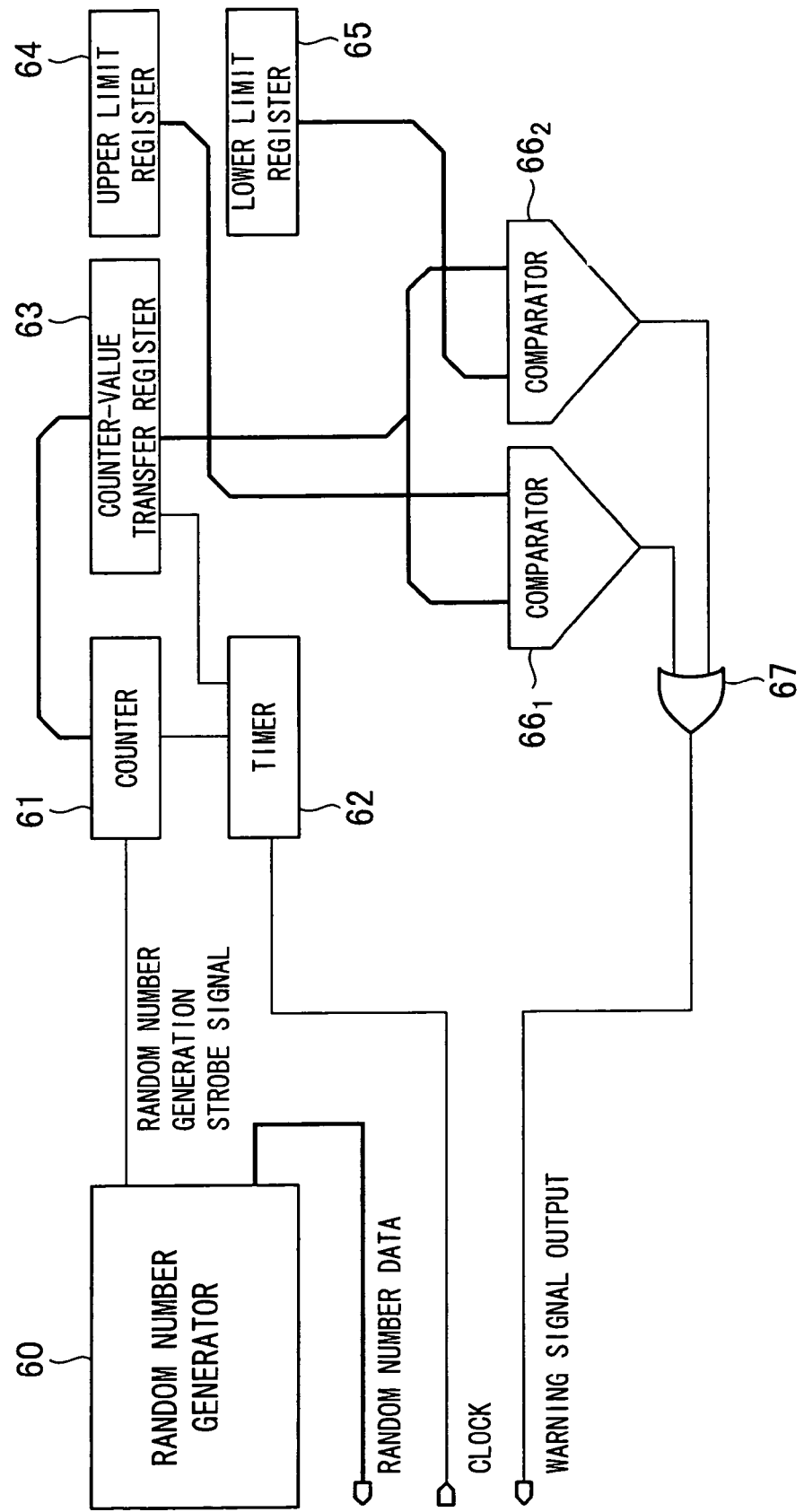
FIG. 10 is a circuit diagram showing one example of a configuration for implementing Random Number Verification III.

FIG. 10 is a circuit diagram showing one example of a configuration for implementing the Random Number Verification III. A random number generator 60 is operable to output 8-bit random numbers, and output a strobe signal every time one random number is generated. This strobe signal is supplied to a counter 61 to increment the counter 61. A timer 62 connected to the counter 61 is operable to count a clock signal so as to form given time-intervals, and send a signal to the counter 61 at the time intervals. When this signal is sent to the counter 61, a count value of the counter 61 at this moment is transferred to a counter-value transfer register 63, and stored thereon.

Further, an upper limit and an lower limit determined in consideration of characteristics of the random number generator 60 are set, respectively, in an upper limit register 64 and a lower limit register 65. An upper limit signal representing the upper limit is sent to one of two input terminals of a comparator $66_1$, and a lower limit signal representing the lower limit is sent to one of two input terminals of a comparator $66_2$. The count value stored on the counter-value transfer register 63 is transferred to each of the other input terminals of the comparators $66_1$, $66_2$. The comparator $66_1$ is designed to output a logical value "1" when the entered count value is greater than the upper limit, and the comparator $66_2$ is designed to output a logical value "1" when the entered count value is less than the upper limit. Each output from these comparators is entered into a 2-input OR circuit 67, and an output from the OR circuit 67 is generated as a warning (alarm) signal. Thus, when either one of outputs from the comparators $66_1$, $66_2$ is changed to "1", the warning signal is generated. This makes it possible to know whether there is a high possibility of occurrence of some problem in the random number generator.

It is understood that the Random Number Verifications I, II and III as described above may be applied to a random number generation device individually, or two or all of these verification techniques may be combined together and applied to a random number generation device.

INDUSTRIAL APPLICABILITY

According to the random number verification method of the present invention, when a random number generation device designed to generate substantially authentic random numbers becomes unable to generate authentic random numbers, this fact can be detected quickly and reliably. The random number verification based on this method can be achieved in a relatively simple circuit configuration. Thus, the random number verification method and apparatus of the present invention can be applied to inspection during shipment in a factory for producing random number generation devices. Further, the random number verification apparatus of the present invention may be attached to or incorporated in a random number generation device formed as an integrated circuit. In this case, when the random number generation device is actually operated after shipment, the random number verification can be continuously carried out. Thus, the present invention makes it possible to perform a random number verification in a wider range than has previously been achieved.

What is claimed is:

1. A random number verification apparatus for use with a random number generation device, comprising:
    a random number acquisition circuit to select a number m of the random numbers generated by the random number generation device, wherein the random number generator generates n possible values, wherein n is a finite, natural number that is greater than 1, and wherein m is a multiple of n;
    an individual-value counting circuit to classify said m random numbers by said n kinds of values, and count the number of times each of the n kind of values occurs in said m random numbers generated by the random number generation device;
    an occurrence frequency-specific value counting circuit to count the number of the n kind of values occurring p times, wherein p is a predetermined number and ($0 \leq p \leq m$), in accordance with the counting result of said individual-value counting circuit;
    a comparison circuit to compare said number of values occurring p times obtained in said occurrence frequency-specific value counting circuit with a predetermined first threshold, and, to determine that said random number generation device has a problem when said number is greater than said first threshold;
        wherein said random number generation device is designed to generate q binary bits ($2^q = n$) of n kinds of values, wherein:
        said random number acquisition circuit decodes the binary obtained as a q-bit signal from said random number generation device, to values of said n kinds of values;
        said individual-value counting circuit includes a number n of counters to count the decoded signal from said decoder;
        said occurrence frequency-specific circuit includes an n-bit shift register, and a counter connected to an output signal of said n-bit shift register; and
        said comparison circuit includes a register storing said first threshold, and a comparator to compare an output of said counter of said occurrence frequency-specific value counting circuit with said first threshold.

2. A random number verification apparatus for use with a random number generation device operable to generate n kinds of values, wherein n is a finite, natural number that is greater than 1, comprising:
    a random number acquisition circuit to select a number m of random numbers generated by the random number generation device, wherein the random number generator generates n possible values, wherein n is a finite, natural number, and wherein m is a multiple of n;
    an individual-value counting circuit to classify said m random numbers by said n kinds of values, and count the number of times each of the n kinds of values occurs in said m random numbers generated by the random number generation device;
    an occurrence frequency-specific value counting circuit to count the number of the n kind of values occurring p times, wherein p is a predetermined number and ($0 \leq p \leq m$), in accordance with the counting result of said individual-value counting circuit;

a comparison circuit to compare said number of values occurring p times obtained in said occurrence frequency-specific value counting circuit with a predetermined second threshold, and, to determine that said random number generation device has a problem when said number is less than said second threshold;

wherein said random number generation device is designed to generate q binary bits ($2^q=n$) of n kinds of values, where:

said random number acquisition circuit decodes the binary obtained as a q-bit signal from said random number generation device, to values of said n kinds of values;

said individual-value counting circuit includes a number n of counters for counting the decoded signal from said decoder;

said occurrence frequency-specific value counting circuit includes an n-bit shift register, and a counter connected to an output signal of said n-bit shift register; and said comparison circuit includes a register storing said second threshold, and a comparator for comparing between an output of said counter of said occurrence frequency-specific value counting circuit with said second threshold.

* * * * *